United States Patent
Dols et al.

(10) Patent No.: US 12,472,049 B2
(45) Date of Patent: Nov. 18, 2025

(54) DEVICE CAPABLE OF HAVING ANTIMICROBIAL, IN PARTICULAR BACTERIOSTATIC OR BACTERICIDAL, ACTIVITY

(71) Applicants: Institucio Catalana de Recerca i Estudis Avancats, Barcelona (ES); Fundacio Institut de Ciencies Fotoniques, Castelldefels (ES); B. Braun Surgical S.A., Rubí (ES)

(72) Inventors: Pau Turón Dols, Rubí (ES); Irene Prieto Martínez, Rubí (ES); Christine Weis, Sant Cugat del Vallés (ES); Ignacio de Miguel, Castelldefels (ES); Romain Quidant, Castelldefels (ES)

(73) Assignees: Institucio Catalana de Recerca i Estudis Avancats, Barcelona (ES); Fundacio Institut de Ciencies Fotoniques, Castelldefels (ES); B. Braun Surgical S.A., Rubí (ES)

( * ) Notice: Subject to any disclaimer, the term of this patent is extended or adjusted under 35 U.S.C. 154(b) by 1092 days.

(21) Appl. No.: 17/278,704

(22) PCT Filed: Oct. 16, 2019

(86) PCT No.: PCT/EP2019/078094
§ 371 (c)(1),
(2) Date: Mar. 23, 2021

(87) PCT Pub. No.: WO2020/079087
PCT Pub. Date: Apr. 23, 2020

(65) Prior Publication Data
US 2022/0031441 A1    Feb. 3, 2022

(30) Foreign Application Priority Data
Oct. 18, 2018 (EP) ..................... 18382744

(51) Int. Cl.
*A61F 2/00* (2006.01)
*A61L 31/02* (2006.01)
*A61L 31/16* (2006.01)

(52) U.S. Cl.
CPC .......... *A61F 2/0063* (2013.01); *A61L 31/022* (2013.01); *A61L 31/16* (2013.01); *A61L 2300/404* (2013.01)

(58) Field of Classification Search
None
See application file for complete search history.

(56) References Cited

U.S. PATENT DOCUMENTS

| 4,911,898 A | 3/1990 | Hagiwara et al. |
| 2013/0018299 A1 | 1/2013 | Ludwig et al. |

FOREIGN PATENT DOCUMENTS

| CN | 107184981 A | 9/2017 |
| ES | 2319056 B1 | 2/2010 |

(Continued)

OTHER PUBLICATIONS

Rieger et al. "Antimicrobial activity of silver ions released from zeolites immobilized on cellulose nanofiber mats", Applied Materials & Interfaces, 8, 3032-3040 (Year: 2026).*

(Continued)

*Primary Examiner* — Isis A Ghali
(74) *Attorney, Agent, or Firm* — Christopher A. Rothe; CM Law (57) ABSTRACT

A device configured for antimicrobial, in particular bacteriostatic or bactericidal, activity, and a method for manufacturing the device. The device includes a device body having a surface. The device body is configured to anchor thermal nanoparticles supporting optical resonance, in particular localized surface plasmon resonance, at its surface. The device body includes thermal nanoparticles supporting (Continued)

optical resonance, in particular localized surface plasmon resonance, bonded to the surface of the device body. The thermal nanoparticles are capable of increasing their temperature by light irradiation in a wavelength range that matches with the wavelength of the optical resonance, in particular localized surface plasmon resonance, of the thermal nanoparticles. The device body also includes an antimicrobial substance that is releasable from the device body.

19 Claims, 5 Drawing Sheets

(56) References Cited

FOREIGN PATENT DOCUMENTS

| WO | 2009024636 A1 | 2/2009 |
| WO | 2015049267 A1 | 4/2015 |

OTHER PUBLICATIONS

Office Action received in European Application No. 18 382 744.3-1110 dated Jun. 4, 2021, 4 pages.
Office Action received in Chinese Application No. 201980068505.2 dated Dec. 2, 2021, with translation, 15 pages.
European Search Reported received in Application No. 18382744.3-1110 dated Feb. 25, 2019, 7 pages.
International Search Reported received in Application No. PCT/EP2019/078094 dated Nov. 12, 2019, 10 pages.
Richa Singh, et al., "Nanoparticles for Control of Biofilms of Acinetobacter Species," materials, MDPI, May 18, 2016, 18 pages.

\* cited by examiner

DEVICE CAPABLE OF HAVING ANTIMICROBIAL, IN PARTICULAR BACTERIOSTATIC OR BACTERICIDAL, ACTIVITY

CROSS REFERENCE TO RELATED APPLICATION(S)

This application is the United States national phase entry of International Application No. PCT/EP2019/078094, filed Oct. 16, 2019, and claims the benefit of priority of European Application No. 18382744.3, filed Oct. 18, 2018. The contents of International Application No. PCT/EP2019/078094 and European Application No. 18382744.3 are incorporated by reference herein in their entireties.

FIELD

The present invention relates to a device capable of having antimicrobial, in particular bacteriostatic or bactericidal, activity.

BACKGROUND

Biofilms are medically important as they may account for a majority of microbial infections in the body. For example, biofilms account for many of the infections which result from microbial colonisation of devices, in particular of medical devices which are provided for permanent or temporary insertion into a patient's body.

Therefore, a considerable amount of effort has been directed towards preventing colonisation of microorganisms on medical devices, for example by using antimicrobial agents such as antibiotics.

However, microorganisms constantly adapt to new chemical substances, thereby developing resistance against them. Thus, finding new solutions to inhibit or stop microbial colonisation on devices such as medical devices becomes increasingly challenging.

WO 2015/049267 A1 relates to a modified surface capable of having bacteriostatic, bactericidal and antimicrobial activity. The surface comprises a substrate configured to anchor thermal nanoparticles supporting local surface plasmon resonance and thermal nanoparticles supporting local surface plasmon resonance bonded to a surface of the substrate forming a thermal coating. The thermal nanoparticles are able to increase their temperature by light irradiation in a wavelength range that matches with the wavelength of the local surface plasmon resonance of the nanoparticles, whereby the thermal coating rises its temperature, allowing the temperature rise of the thermal coating to avoid the attachment of microorganisms to the substrate's surface, to inhibit the formation of a biofilm on the substrate's surface and/or to destroy an already formed biofilm on the substrate's surface.

Though the modified surface known from WO 2015/049267 A1 embodies a powerful solution to inhibit or stop microbial colonisation on devices such as medical devices, there is still the need to provide a novel way of infection prevention and/or biofilm inhibition and/or biofilm destruction which will be adequate for any type of device, and which properties will be maintained for a long term.

SUMMARY

In view of the foregoing, the object underlying the present invention is therefore to make available a device exhibiting antimicrobial activity, in particular an optimized or more powerful antimicrobial activity in comparison to devices known from the prior art.

According to a first aspect, the invention relates to a device capable of having antimicrobial, in particular bacteriostatic or bactericidal, activity. The device may be a medical device or a non-medical device. As disclosed in the following, the device of the present invention is preferably a medical device.

The device comprises a device body having a surface, wherein the device body is configured to anchor or bond thermal nanoparticles supporting optical resonance, in particular localized surface plasmon resonance, at its surface, i.e. at the surface of the device body, wherein the device body comprises thermal nanoparticles which support optical resonance, in particular localized surface plasmon resonance, and which are bonded or anchored to the surface of the device body, wherein the thermal nanoparticles are capable of increasing their temperature by light irradiation in a wavelength range that matches with the wavelength of the optical resonance, in particular localized surface plasmon resonance (LSPR), of the thermal nanoparticles, and an antimicrobial substance, wherein the antimicrobial substance is capable of being released, i.e. liberated or removed, from the device body.

The surface of the device body preferably acts as a plasmonic meta-surface that supports surface plasmons to which light couple.

Further, the thermal nanoparticles preferably form a thermal coating on the surface of the device body, wherein the thermal coating rises its temperature upon light irradiation of the thermal nanoparticles at their optical wavelength, in particular LSPR wavelength, wherein the temperature rise of the thermal coating allows to avoid the attachment of microorganisms to the surface of the device body and/or to inhibit or stop the formation of a biofilm on the surface of the device body and/or to destroy an already formed biofilm on the surface of the device body.

The coherent oscillation of electrons of the thermal nanoparticles driven by light irradiation causes an increase of the nanoparticles' temperature, whereby the thermal nanoparticles, in particular a thermal coating comprising the thermal nanoparticles, are additionally heated by thermal diffusion.

The rise in temperature of the thermal nanoparticles, in particular of a thermal coating comprising the thermal nanoparticles, induce the destruction or alteration of extracellular polymeric substances which are used by microorganisms for adhering to the surface of the device body, thus preventing their attachment to the surface of the device body. Further, this rise in temperature of the device body's surface also destroys the microorganisms already adhered to the device body's surface thus inhibiting the creation of a biofilm.

The term "device capable of having antimicrobial, in particular bacteriostatic or bactericidal, activity" as used according to the present invention refers to an antimicrobial, in particular a bacteriostatic or bactericidal, device.

The term "antimicrobial device" as used according to the present invention refers to a device that is capable of killing microorganisms or stopping their growth, in particular on its surface.

The term "bacteriostatic device" as used according to the present invention refers to a device that is capable of stopping bacteria from reproducing, in particular on its surface.

The term "bactericidal device" as used according to the present invention refers to a device that is capable of killing bacteria, in particular on its surface.

Accordingly, the term "antimicrobial substance" as used according to the present invention refers to a substance or agent that is capable of killing microorganisms or stopping their growth, the term "bacteriostatic substance" as used according to the present invention refers to a substance or agent that is capable of stopping bacteria from reproducing and the term "bactericidal substance" as used according to the present invention refers to a substance or agent that is capable of killing bacteria.

Thus, in accordance with the preceding paragraph, the term "antimicrobial substance" as used according to the present invention may be also denoted as "antimicrobial agent". Accordingly, the term "bacteriostatic substance" as used according to the present invention may be also denoted as "bacteriostatic agent". Further, the term "bactericidal substance" as used according to the present invention may be also denoted as "bactericidal agent".

The term "microorganisms" as used according to the invention refers to any type of unicellular organism including bacteria and/or fungi and/or also refers to viruses. Preferably, the term "microorganisms" as used according to the present invention refers to pathogenic microorganisms or pathogens, in particular bacteria and/or fungi and/or viruses and/or components thereof.

The term "nanoparticles" as used according to the present invention refers to particles having a mean particle diameter from 10 nm to 1 μm, in particular 10 nm to ≤100 nm, preferably 10 nm to <100 nm. The mean particle diameter may be determined by means of conventional methods such as dynamic light scattering, transmission electron microscopy (TEM) or scanning electron microscopy (SEM).

The term "surface plasmon resonance" (SPR) refers to the collective resonant oscillation of electrons of a material excited by incident light (light irradiation). The resonance condition is established when the frequency (wavelength range) of light matches or couples the natural frequency (wavelength band) of quasi-free electrons oscillating against the restoring force of positive nuclei. SPR in nanometer-sized nanoparticles is also called localized surface plasmon resonance (LSPR).

The term "light irradiation" or "light irradiated" as used according to the present invention refers to the range of optical wavelengths used to rise the temperature of the thermal nanoparticles. The wavelength of this light should overlap with the wavelength optical resonance, in particular wavelength plasmon resonance, of the thermal nanoparticles. For medical devices being adapted or provided for a permanent or temporary insertion into a patient's body, in particular for surgical implants, the irradiated wavelength range is preferable within 750 nm to 1200 nm.

The term "thermal nanoparticles" as used according to the present invention refers to nanoparticles, in particular plasmonic nanoparticles, engineered to generate an electric field inside of the nanoparticles upon light irradiation. The thermal nanoparticles may be in particular plasmonic nanoparticles engineered to absorb into the nanoparticles the incident light upon light irradiation and mainly dissipate into the ions network the light intercepted by the nanoparticles and the corresponding energy stored in the electron cloud, generating a heating on the nanoparticles.

Therefore, the thermal nanoparticles of the present invention are configured to generate an electric field inside of the thermal nanoparticles when they are light irradiated. Thus, the generated electric field inside of the thermal nanoparticles is responsible of the heat generation of the thermal nanoparticles, and the power of heat generation inside the thermal nanoparticles is directly proportional to the absorption cross-section.

The term "biofilm" as used according to the present invention refers to an accumulation of microorganisms that are embedded in extra-cellular substances, preferably in a polysaccharide matrix, and adhere to solid biologic and/or non-biologic surfaces, such as surfaces of medical devices, in particular surfaces of surgical implants.

The present invention is based on the surprising finding that combination of two antimicrobial concepts, i.e. thermal nanoparticles supporting optical resonance, in particular localized surface plasmon resonance, anchored or bonded to a surface of a device body and an antimicrobial substance which is capable of being released from a device body, results in a considerably improved and thus optimized antimicrobial activity of a device in comparison to devices, in particular medical devices, only realizing one of both concepts.

More specifically, by combining both of the above concepts the inventors could confirm the following unexpected effects:

The combination of thermal nanoparticles supporting optical resonance, in particular localized surface plasmon resonance, and an antimicrobial substance which is capable of being released from a device body resulted in a substantial temperature increase of the surface of the device body under light irradiation. This substantial temperature rise is especially advantageous in terms of improved biofilm prevention and/or improved biofilm destruction. This unexpected improvement is especially relevant in medical applications where the intensity of light applied is limited by skin pain or injuries and the intensity that arrives to the device is limited by the attenuation of the light in the tissues. Any improvement in this aspect is then important in terms of antimicrobial, in particular bacteriostatic and/or bactericidal, efficacy and patient compliance.

Further, the inventors were able to confirm that during light irradiation of the device an instant and enhanced release of the antimicrobial substance took place. Such a boosted release of the antimicrobial substance is also advantageous in terms of optimized biofilm prevention and/or optimized biofilm destruction.

The above effects may be advantageously accomplished in a non-invasive manner and/or repeatedly, if desired, and/or at any time when necessary and/or over a long period of time and/or locally confined, if necessary.

The above effects were successfully evidenced by the inventors using surgical meshes as device bodies.

The antimicrobial substance may be a bacteriostatic or bactericidal substance.

In an embodiment of the invention, the antimicrobial substance is capable of being released from the device body in an ionic, preferably cationic, condition, in particular in contact with water or a water-containing liquid, in particular a body fluid such as blood, urine, tissue liquid or the like.

Principally, the antimicrobial substance may be present in the device body in a neutral or non-ionic condition and may be transferred to the ionic, preferably cationic, condition before and/or after its release from the device body. Preferably, the antimicrobial substance may be transferred to the ionic, preferably cationic, condition in contact with water or a water-containing liquid, in particular a body fluid such as blood, urine, tissue liquid or the like.

In a further embodiment of the invention, the antimicrobial substance is present in the device body in an ionic, preferably cationic, condition.

The term "ionic condition" or "cationic condition" as used according to the present invention preferably comprises or defines metal cations, in particular monovalent or divalent metal cations, or alloy cations, in particular monovalent or divalent alloy cations, of the antimicrobial substance.

The term "metal cations" as used according to the present invention refers to cations, in particular monovalent or divalent cations, which comprise or consist of a metal. With respect to possible metals, it is referred to the following description.

Accordingly, the term "alloy cations" as used according to the present invention refers to cations, in particular monovalent or divalent cations, which comprise or consist of an alloy. With respect to possible alloys, it is also referred to the following description.

In a further embodiment of the invention, the antimicrobial substance comprises or consists of a metal or an alloy.

The term "alloy" as used according to the present invention refers to a combination of metals, i.e. a combination of at least two different metals, or to a combination of at least one metal and at least one non-metal such as silicon.

Preferably, the metal or alloy is selected from the group consisting of silver, gold, copper, zinc, titanium and alloys thereof.

More preferably, the metal is silver. In that regard, the advantages of the present invention are especially evident.

Alternatively or in combination, the antimicrobial substance may comprise or consist of a metal oxide. The metal oxide may be selected from the group consisting of silver oxide, gold oxide, copper oxide, zinc oxide, titanium oxide and combinations thereof.

Further, the antimicrobial substance may comprise or consist of a different material than the thermal nanoparticles.

In a further embodiment of the invention, the antimicrobial substance is embodied or defined as metallic cations, in particular ion-exchangeable metal cations. The metal cations may be monovalent or divalent metal cations. Preferably, the metal cations are selected from the group consisting of silver ions, gold ions, copper ions, zinc ions, titanium ions and combinations thereof.

In a further embodiment of the invention, the device body further comprises a carrier, preferably a carrier for the antimicrobial substance. In other words, the antimicrobial substance is preferably supported by a carrier.

The term "carrier" as used according to the present invention refers to a material or structure which is adapted to carry or support the antimicrobial substance.

By the presence of a carrier, some surface roughness of the device body may be advantageously induced, in particular on the surface of the device body, thereby preferably introducing an enhancement in the light interaction with the thermal nanoparticles. Further, by the presence of a carrier the optical behaviour of the device body towards light (transmission and/or dispersion and/or reflection) may be advantageously modified, thereby inducing a better yield of light conversion into heat by the thermal nanoparticles.

Preferably, the carrier is not capable of being released, i.e. liberated or removed, from the device body. In particular, the carrier may be firmly bonded to the device body, in particular to a material of the device body. With respect to suitable materials for the device body, reference is made to the following description.

More preferably, the carrier is a particulate carrier, i.e. a carrier which is defined or embodied as particles, in particular microparticles. In that regard, it was additionally surprising that the higher the proportion of the antimicrobial substance in the device body is, the higher is the temperature rise of the surface of the device body during light irradiation. The particles may have a mean diameter from 100 nm to 20 µm, in particular 500 nm to 10 µm, preferably 1 µm to 5 µm. The mean particle diameter may be determined by means of conventional methods such as dynamic light scattering, transmission electron microscopy (TEM) or scanning electron microscopy (SEM)

In a further embodiment of the invention, the carrier is porous, preferably open-pored. In particular, the carrier may comprise pores having a mean diameter from 1 Å to 500 Å, in particular 1 Å to 100 Å, preferably 1 Å to 20 Å. The mean pore diameter may be also determined by means of conventional methods such as dynamic light scattering, transmission electron microscopy (TEM) or scanning electron microscopy (SEM).

Further, the antimicrobial substance is preferably adsorbed or located onto a surface of the carrier and/or is preferably contained in or within pores and/or voids of the carrier.

More preferably, the antimicrobial substance is non-covalently bonded to the carrier, in particular to an outside and/or porous surface of the carrier. Especially preferably, the antimicrobial substance is bonded to the carrier, in particular to an outside and/or porous surface of the carrier, by means of ionic interactions. Thus, an enhanced release of the antimicrobial substance during light irradiation of the device can be advantageously facilitated and/or maintained over a prolonged period of time.

Principally, the carrier can comprise a varying or different proportion of the antimicrobial substance that may be released from the device body, in particular in contact with water or a water-containing liquid such as a body liquid.

In a further embodiment of the invention, the antimicrobial substance has a proportion from 0.01% by weight to 15% by weight, in particular 1% by weight to 5% by weight, preferably 0.5% by weight to 3% by weight, more preferably 0.5% by weight to 2.5% by weight, related to the total weight of the carrier, i.e. of the carrier including the antimicrobial substance.

Further, the antimicrobial substance and the carrier altogether may have a proportion from 0.01% by weight to 20% by weight, in particular 1% by weight to 10% by weight, preferably 2% by weight to 5% by weight, related to the total weight of the device or device body.

Further, the carrier may have a shape that is selected from the group consisting of a rod shape, a cylindrical shape, a triangular shape, a pyramidal shape, a cubic shape, a spherical shape, a star shape and a combination thereof.

In a further embodiment of the invention, the carrier is a zeolite. The zeolite may be a natural zeolite or a synthetic zeolite.

The term "zeolite" as used according to the present invention refers to an aluminosilicate having a three dimensional skeletal structure that is represented by the formula: $XM_{2/n}O \cdot Al_2O_3 \cdot YSiO_2 \cdot ZH_2O$, wherein M represents an ion-exchangeable ion, generally a monovalent or divalent metal ion, n represents the atomic valency of the (metal) ion, X and Y represent coefficients of metal oxide and silica respectively, and Z represents the number of water of crystallization.

In particular, the zeolite as used according to the present invention may be selected from the group consisting of A-type zeolite, X-type zeolite, Y-type zeolite, T-type zeolite, high-silica zeolite, sodalite, mordenite, analcite, clinoptilolite, chabazite and erionite.

Especially preferably, the carrier is a microporous crystallized aluminosilicate. This type of zeolite is advantageously stable at very high temperatures to be used, for example during a co-extrusion process with a polymeric material.

For example, the zeolite may be a zeolite that is commercially available under the notation "AW10D", which is a AW zeolite type from Agion, comprising a proportion of silver ions of 0.5% by weight to 0.6% by weight, related to the total weight of the zeolite, i.e. of the zeolite including the silver ions. Alternatively, the zeolite may be a AJ zeolite type from Agion, comprising a proportion of silver ions of 2.5% by weight or approximately 2.5% by weight, related to the total weight of the zeolite, i.e. of the zeolite including the silver ions.

Further, the zeolite may be prepared by replacing some or all of the ion-exchangeable ions in zeolite (e.g., sodium ions and/or calcium ions and/or potassium ions and/or iron ions) with silver ions and/or copper ions and/or zinc ions. More specifically, the zeolite as used according to the present invention may be prepared as disclosed in U.S. Pat. No. 4,911,898, the disclosure of which is hereby incorporated by reference.

Further, the antimicrobial substance, in particular the antimicrobial substance along with the carrier, is preferably dispersed or distributed within or throughout the device body.

More specifically, the antimicrobial substance, in particular the antimicrobial substance along with the carrier, may be homogeneously dispersed or distributed within or throughout the device body.

Alternatively, the antimicrobial substance, in particular the antimicrobial substance along with the carrier, may be non-homogeneously dispersed or distributed within or throughout the device body. For example, the antimicrobial substance, in particular the antimicrobial substance along with the carrier, may have a higher proportion in a region or layer of the device body which is close to the device body's surface than in a region or layer of the device body which is away from the device body's surface. Thus, the release of the antimicrobial substance during light irradiation of the device can be additionally enhanced.

Further, the antimicrobial substance may be defined or embodied as particles, in particular nanoparticles and/or microparticles. The particles may have a mean diameter from 1 nm to 1000 nm, in particular 10 nm to 300 nm, preferably 5 nm to 20 nm. The mean diameter may be determined by means of conventional methods such as dynamic light scattering, transmission electron microscopy (TEM) or scanning electron microscopy (SEM).

Further, the antimicrobial substance may have a shape that is selected from the group consisting of a rod shape, a cylindrical shape, a triangular shape, a pyramidal shape, a cubic shape, a spherical shape, a star shape, an irregular shape and a combination thereof.

Further, the antimicrobial substance may have a different shape than the thermal nanoparticles. Possible shapes for the thermal nanoparticles will be disclosed in the following description.

Principally, the thermal nanoparticles may be bonded or anchored to the surface of the device body by different ways. For example, the thermal nanoparticles may be anchored or bonded via a covalent bond, in particular using a functional molecule, or via an electrostatic interaction, or via a complexing reaction. A combination of these different ways to anchor or bond the thermal nanoparticles on the surface of the device body may also be contemplated within the scope of the present invention. The functional molecule is expediently a bi-functional molecule or a molecule having at least two reactive endings.

In a further embodiment of the invention, the thermal nanoparticles are firmly or non-releasable, in particular covalently, bonded or anchored to the surface of the device body.

Advantageously, the thermal nanoparticles are non-cytotoxic. For example, after implantation of the device in a body, the thermal nanoparticles may be able to absorb visible light through tissue without damaging it. The light energy is transformed into heat and thereby able to destroy microorganisms which are in contact with the thermal nanoparticles. This increase of temperature by light irradiation is a non-invasive method and converts the device into a device having an antimicrobial, in particular bacteriostatic or bactericidal, surface. This non-invasive treatment can be performed easily and repeatedly at any time after the implantation for a long period of time.

When the antimicrobial, in particular bacteriostatic or bactericidal, activity is directed to surgical implants for human applications, the light irradiation is preferable in the infrared spectrum in order to reduce damage in the surrounded healthy tissue. Only as reference, the correspondence of the wavelength with the photon energy is shown in the table 1 below.

TABLE 1 correspondence of the wavelength with the photon energy
Regions of the optical spectrum

| Name | Wavelength | Frequency (Hz) | Photon energy (eV) |
|---|---|---|---|
| X-ray | 0.01 nm-10 nm | 30 EHz-30 PHz | 124 eV-124 keV |
| Ultraviolet | 10 nm-380 nm | 30 PHz-790 THz | 3.3 eV-124 eV |
| Visible | 380 nm-700 nm | 790 THz-430 THz | 1.7 eV-3.3 eV |
| Infrared | 700 nm-1 mm | 430 THz-300 GHz | 1.24 meV-1.7 eV |
| Microwave | 1 mm-1 m | 300 GHz-300 MHz | 1.24 µeV-1.24 meV |

Further, the thermal nanoparticles may have a mean diameter from 10 nm to 1 µm, in particular 10 nm to ≤100 nm, preferably 10 nm to <100 nm.

Further, the thermal nanoparticles may have a shape selected from the group consisting of a rod shape, a cylindrical shape, a triangular shape, a pyramidal shape, a cubic shape, a spherical shape, a star shape and a combination thereof.

Preferably, the thermal nanoparticles have rod shape.

Further, the thermal nanoparticles may present a longitudinal surface plasmon resonance (LSR), with a maximum absorbance in a wavelength range from 500 nm to 1200 nm, preferably 750 nm to 1200 nm, more preferably 750 nm to 900 nm. The wavelength of the maximum of LSR depends on the size, shape and material of the thermal nanoparticles. In case of rod shape, the intensity of the LSR is particularly high and the position may be easily tunable by the aspect ratio of the rod. For example, the rod shape may have an aspect ratio from 1 to 10, in particular 2 to 7, preferably 3 to 5.

In a further embodiment of the invention, the thermal nanoparticles comprise or consist of a material selected from the group consisting of gold, silver, copper, zinc, titanium, a semiconductor, an oxide, a metal oxide, a non-metallic material such as silicone, or a combination thereof.

Preferably, the material is gold. In other words, the thermal nanoparticles are preferably thermal nanoparticles comprising or consisting of gold.

Further, the thermal nanoparticles may be anchored or bonded to the device body's surface in a density from 10 thermal nanoparticles/$\mu m^2$ to 1000 thermal nanoparticles/$\mu m^2$. The density of the thermal nanoparticles may depend on the shape and/or geometry and/or cross-section of the thermal nanoparticles.

Further, any light source which is capable of generating the optical wavelength within the desirable wavelength spectrum of the thermal nanoparticles can be used to irradiate the device. For example, a fluorescent or halogen lamp, a laser, an intense pulsed light, a light-emitting diode, an incandescent or chemiluminescence light or a combination thereof may be used as a light source within the scope of the present invention.

For medical applications, the light irradiated is preferably within the infrared spectrum because the human tissue is transparent to the infrared light down to a few centimetres deep. Therefore, it is possible to rise the temperature of the device body's surface by light irradiation, for example, from outside of a body.

The device may comprise any type of device body which is able to anchor or bond thermal nanoparticles to which light can be coupled. For that purpose, the device body may be previously activated using any surface modification method known in the art. Only as mere exemplary, physic-chemical methods such as a treatment with active gases and vapours or irradiation (plasma), deposition of polymers from active gases and vapours (chemical vapour deposition), active gas or accelerated ion treatments (gas phase oxidation with ozone and/or ion beam), cross-linking of surface molecules, mechanical methods such as roughening, chemical methods such as physical absorption, chemical conjugation to surface groups, chemical modification of the surface, graft polymerization with radiation initiation or chemical initiation, coating of the surface with an active component or coating matrix which contains active components are described herein.

The device body or the thermal nanoparticles may also contain functionalized groups or may be functionalized by an activation process, with reactive groups. The reactive groups may be selected from the group consisting of fluoride, chloride, bromide, iodide, carbaldehyde, keto, carboxylate, cyano, nitro, amide, hydroxyl, amine, sulfate, sulfide, phosphate, phosphite, oxy, mercapto and thio.

Further useful groups may be selected from the group consisting of complex forming groups, groups able to form hydrogen bonds, molecules containing ionic groups for ionic adsorption and a combination thereof.

Examples of alternatives are common cross-linkers like imidoester cross-linker dimethyl suberimidate, N-hydroxysuccinimide-ester, formaldehyde, glutaraldehyde, or the like. Other useful bi-functional cross-linkers may be a BOC-amino containing compound, ethane thiol, mercapto-1-butanol, or the like.

Further, the surface of the thermal nanoparticles can be also modified in order to bond to the surface of the device body as described herein. This modification can be performed by using hetero- or homo-functional molecules able to bind on one side to the surface of the thermal nanoparticles and on the other side to the device body, for example the modification of a surface of thermal nanoparticles comprising or consisting of gold with thiol containing reagents which has on the other side the desired functional group able to bind to the device body either covalently or by ionic interaction. These hetero- or homo-functional molecules preferably include all HS—R-functional groups, where —R relates to any alkyl or polyethylene glycol chain and the functional groups relate to any chemical group able to be activated and coupled to the device body's surface. Especially HS—R—COOH, HS—R—NH$_2$, HS—R—SH, HS—R—SO$_3$H and HS—R—N(CH$_2$)$_3^+$ are suitable for the purpose of anchoring or bonding the thermal nanoparticles to the surface of the device body. The thermal nanoparticles' surface can be also modified by polyvinylpyrrolidone and a large number of polymers.

Alternatively, the device body may not require to be activated, neither may require the use of a functional molecule. In such a case, the device body can, by way of example, be made of a polymer or a copolymer which has active groups, such as free amino groups, in and/or on its surface. These active groups can directly anchor or bond thermal nanoparticles without the need to previously prepare the device body. Preferably, the anchoring method is not reversible.

Further, the surface of the device body may be activated by cold plasma polymerization, for example activated by the deposition of molecules like PFM (pentafluorophenyl methacrylate) and/or ethylene diamine.

Further, the device body or the thermal nanoparticles may be functionalized with a functional molecule, the functional molecule preferably being a diamine derivative.

With respect to further features and advantages of thermal nanoparticles supporting localized surface plasmon resonance and methods for anchoring or bonding such nanoparticles on the surface of a suitable substrate, reference is made to the WO 2015/049267 A1.

In a further embodiment of the invention, the device body further comprises a material, preferably a non-degradable or non-absorbable material. The material may be also denoted as a base material or matrix material of the device body.

The material may be in particular selected from the group consisting of a polymer, a plastic, a resin, a metal, a metal oxide, an alloy such as steel, a glass, a ceramic material and a combination thereof.

The polymer may be in particular selected from the group consisting of polypropylene, polyethylene, low-density polyethylene, high density polyethylene, high-molecular-weight polyethylene, ultra-high-molecular-weight polyethylene, polyethylene terephthalate, polypropylene terephthalate, polybutylene terephthalate, polytetrafluorethylene and a combination thereof.

Further, the device body may comprise or consist of a degradable or absorbable polymer, in particular selected from the group consisting of polylactide, polyglycolide, polycaprolactone, poly(trimethylene carbonate), polydioxanone, poly-3-hydroxy butyrate, poly-4-hydroxy butyrate and a combination thereof.

In a further embodiment of the invention, the device body comprises or is a textile structure. The textile structure preferably comprises or is a yarn, a woven fabric, a mesh, a knitted fabric, knit fabric (interlaced yarns) such as warp knit fabric or a non-woven.

The yarn may be a monofilament, a pseudo monofilament or a multifilament.

Preferably, the textile structure comprises or is a mesh, in particular a knitted mesh. For example, the mesh may be a mesh which is commercially available under the notation "Optilene® Mesh", i.e. a mesh made of monofilaments comprising polypropylene as a base material or consisting of polypropylene, wherein the mesh has a square weight of 60 g/m² and a pore diameter of 1.5 mm. Alternatively, the mesh may be a mesh which is commercially available under the notation "Optilene® Mesh LP", i.e. a mesh made of monofilaments comprising polypropylene as a base material or consisting of polypropylene, wherein the mesh has a square weight of 36 g/m² and a pore diameter of 1.0 mm. Alternatively, the mesh may be a mesh which is commercially available under the notation "Optilene® Mesh Elastic", i.e. a mesh made of monofilaments comprising polypropylene as a base material or consisting of polypropylene, wherein the mesh has a square weight of 48 g/m² and a pore size of 3.6×2.8 mm.

In a further embodiment of the invention, the device is a medical device, in particular a medical device for human or veterinary applications. Preferably, the medical device is a surgical implant.

In particular, the medical device may be a surgical mesh, a wound dressing, a suture, a vascular prosthesis, a stent, a stent-graft, a vascular access, a catheter, a medical tool, straight forceps, a connector, a medical tube, a bag, a medical needle, a probe or a medical instrument.

The surgical mesh may be selected from the group consisting of surgical mesh for hernia repair, surgical mesh for prolapse repair and incontinence tape.

The catheter may be an intravascular, in particular an arterial catheter or a venous catheter, or a urinary catheter.

The medical tube may be an endotracheal tube or a drainage tube such as an abdominal cavity drainage tube.

Alternatively, the device may be a non-medical device.

According to a second aspect, the invention relates to a method for manufacturing a device capable of having antimicrobial, in particular bacteriostatic or bactericidal, activity, in particular according to the first aspect of the invention, the method comprising the steps of:
  preparing a device body for anchoring thermal nanoparticles supporting optical resonance, in particular localized surface plasmon resonance, wherein the device body comprises an antimicrobial substance, wherein the antimicrobial substance is capable of being released, i.e. liberated or removed, from the device body,
  selecting thermal nanoparticles supporting optical resonance, in particular localized surface plasmon resonance, and
  bonding the selected thermal nanoparticles to the device body, preferably thereby forming a thermal coating, wherein the thermal nanoparticles are capable of increasing their temperature by light irradiation in a wavelength range that matches with the wavelength of the optical resonance, in particular localized surface plasmon resonance, of the thermal nanoparticles, preferably whereby the thermal coating rises its temperature upon light irradiation of the thermal nanoparticles, wherein the temperature rise of the thermal coating allows to avoid the attachment of microorganisms to the surface of the device body and/or to inhibit or stop the formation of a biofilm on the surface of the device body and/or to destroy an already formed biofilm on the surface of the device body.

The device body may be prepared by mixing a material, in particular a base or matrix material, and the antimicrobial substance, in particular the antimicrobial substance supported by a carrier, and subsequently by forming the mixture to the device body. The mixture may be formed to the device body, by way of example, by means of injection mold, or the like. As regards the material, in particular base or matrix material, as mentioned in this paragraph, reference is made in its entirety to the materials already disclosed in terms of the device body in the previous description.

Alternatively, the antimicrobial substance may be added to an already manufactured device body, for example by means of a soaking or dipping technique.

Further, the device body may be prepared by
  activating a surface of the device body by a surface modification method and/or
  functionalising a surface of the device body with a functional molecule, which has at least two reactive endings and/or
  functionalising a surface of the thermal nanoparticles with a functional molecule, which has at least two reactive endings.

For further features and advantages of the method, reference is made in its entirety to the description of the first invention aspect. The features and advantages mentioned there, in particular in terms of the device, device body, thermal nanoparticles and antimicrobial substance, applies, mutatis mutandis, to the method according to the second aspect of the invention.

Further features and advantages of the invention will become clear from the following description of preferred embodiments in form of figures, figure descriptions and examples. The individual features can be realized either singularly or severally in combination in one embodiment of the invention. The preferred embodiments merely serve for illustration and better understanding of the invention and are not to be understood as in any way limiting the invention.

BRIEF DESCRIPTION OF THE DRAWING FIGURES

For better understanding of what has been disclosed, some figures are attached which schematically or graphically and solely by way of non-limiting example show a practical case of embodiment.

DETAILED DESCRIPTION

Figure 1:
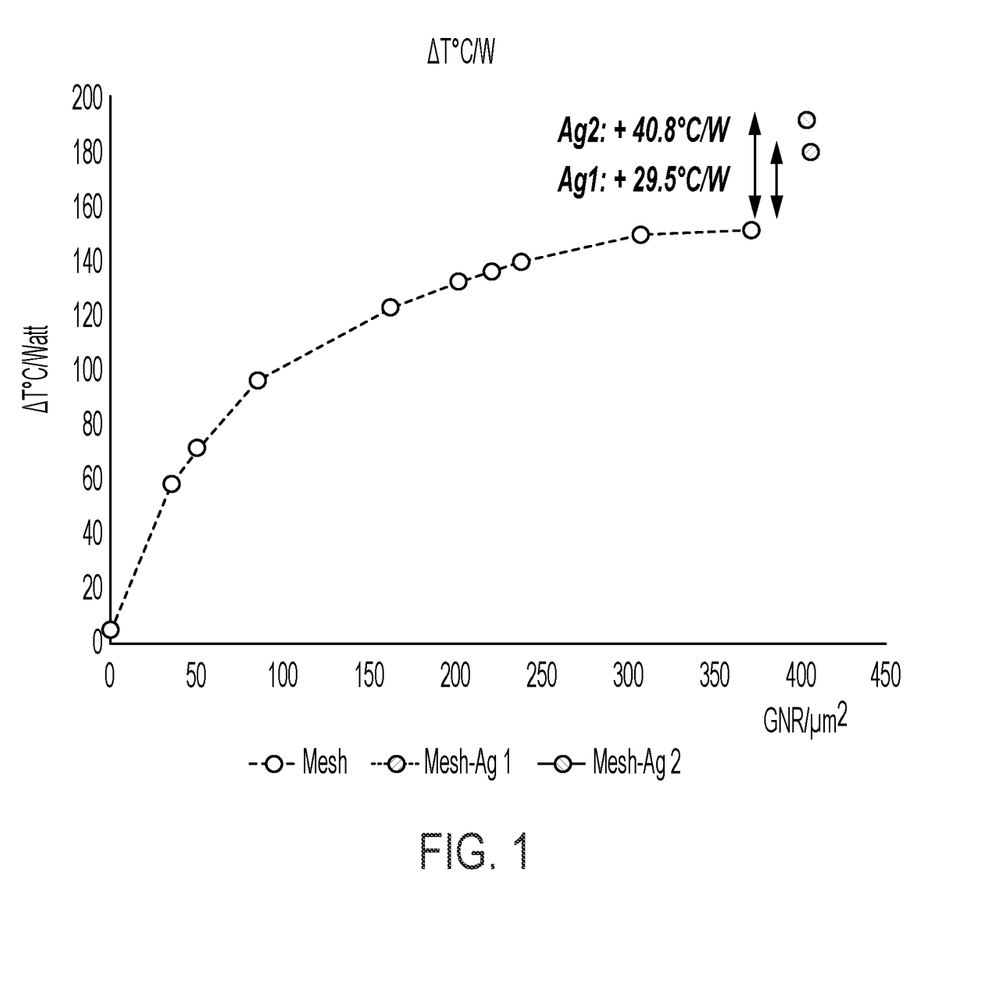
FIG. 1 graphically shows the evolution of the temperature increase of meshes in ° C./W, as a function of gold nanoparticles content in NR/µm².

FIG. 1 graphically shows the evolution of the temperature increase of meshes in ° C./W, as a function of gold nanoparticles content in NR/µm².

The mesh with the notation "Mesh" is Optilene® Mesh LP comprising rod-shaped gold nanoparticles bonded to its surface, but lacking releasable silver ions.

The mesh with the notation "Mesh-Ag 1" is Optilene® Mesh LP comprising rod-shaped gold nanoparticles bonded to its surface, and comprising a zeolite (AW10D) containing releasable silver ions.

The mesh with the notation "Mesh-Ag 2" is Optilene® Mesh LP comprising rod-shaped gold nanoparticles bonded to its surface, and comprising a zeolite (AW10D) containing releasable silver ions, wherein the content of releasable silver ions is higher than the content of releasable silver ions of "Mesh-Ag 1".

The results shown in FIG. 1 clearly confirm a substantial temperature increase under light in case of "Mesh-Ag 1" and "Mesh-Ag 2" compared to "Mesh". Further, the results shown in FIG. 1 confirm that the temperature increase is higher in case of "Mesh-Ag 2" than in case of "Mesh-Ag 1".

Thus, the results shown in FIG. 1 support that the temperature increase of a thermal nanoparticles modified device under light irradiation can be additionally enhanced in the presence of the zeolite carrier containing silver ions being releasable from the device. Further, the results of FIG. 1 support that the temperature rise under light irradiation is higher, the higher the content or proportion of the carrier containing releasable silver ions is.

Figure 2:
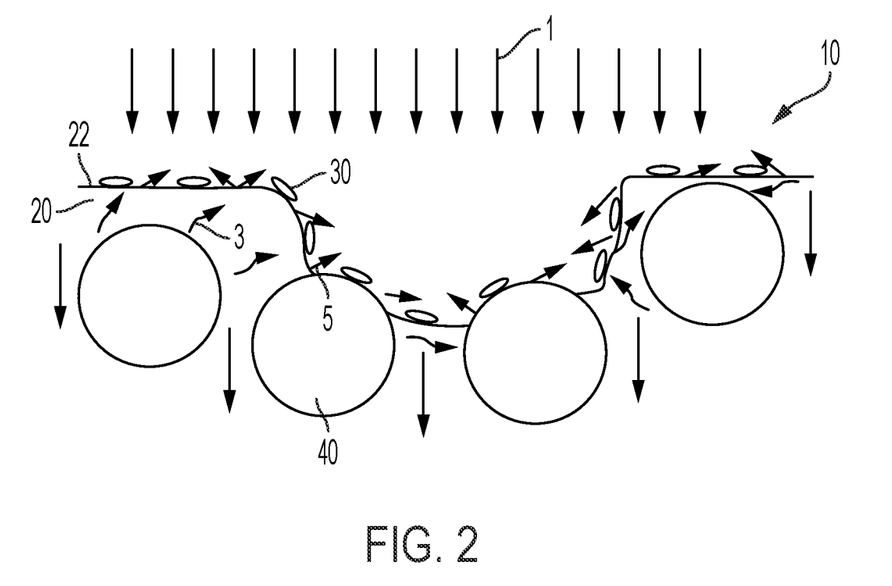
FIG. 2 schematically shows a section of a cross-sectional or longitudinal cut of a medical device according to the present invention under light irradiation.

FIG. 2 schematically shows a section of a cross-sectional or longitudinal cut of a medical device according to the present invention under light irradiation and the possible processes which may take place under this circumstance at the surface of the device.

The device 10 comprises a device body 20. The device body 20 comprises thermal gold nanoparticles 30 supporting localized surface plasmon resonance which are anchored or bonded to a surface 22 of the device body 20. Preferably, the thermal gold nanoparticles 30 have a rod-shape.

Further, the device body 20 comprises zeolite particles 40 supporting releasable silver ions, wherein the silver ions may be adsorbed onto a surface of the zeolite particles 40 and/or may be contained within pores and/or voids of the zeolite particles 40. Upon contact with water or body liquids, the silver ions are released from the device body 20.

Upon light irradiation 1, a temperature rise of the thermal gold nanoparticles 30, in particular of a thermal coating which is formed or comprises the thermal gold nanoparticles 30, and thus of the surface 22 of the device body 20 is induced. The temperature rise is advantageously significantly higher compared to a medical device which lacks releasable silver ions.

In addition, enhanced release of silver ions is induced under the light irradiation 1 compared to a medical device which lacks the thermal gold nanoparticles.

Advantageously, the zeolite particles 40 induce some surface roughness of the device body 20, thereby introducing an enhancement in the light interaction with the thermal gold nanoparticles 30, for example in form of diffuse light 3 and/or reflected light 5 which supports the temperature rise and in particular the enhanced release of silver ions.

Preferably, the device 10 is a medical device, in particular a surgical implant, preferably a surgical mesh, for example a surgical mesh for hernia or prolapse repair.

Figure 3:
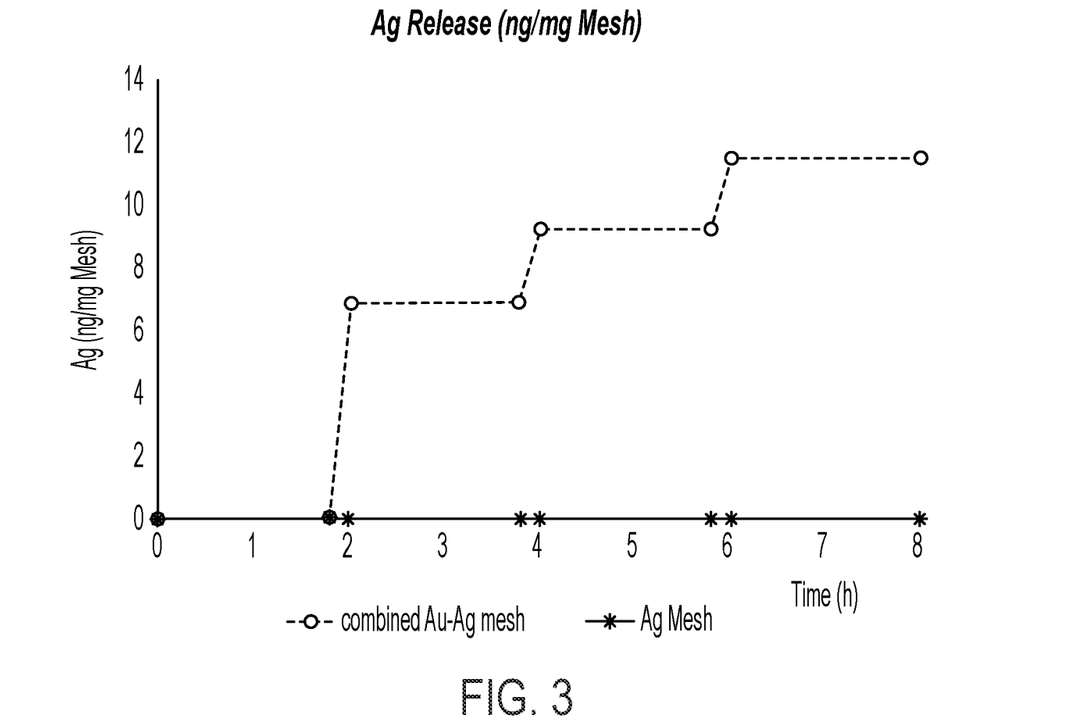
FIG. 3 schematically shows the release of silver ions in ng/mg mesh under light irradiation (laser, 810 nm, 16 W/cm²-3× seconds) as a function of time (h) of a surgical mesh.

FIG. 3 schematically shows the release of silver ions in ng/mg mesh under light irradiation (laser, 810 nm, 16 W/cm²-3× seconds) as a function of time (h) of a surgical mesh. The mesh with the notation "Combined Au—Ag mesh" is modified with gold nanoparticles anchored to the surface of the mesh and further with releasable silver ions.

The mesh with the notation "Combined Ag mesh" is modified with gold nanoparticles anchored to the surface of the mesh, but lacking releasable silver ions.

The release of silver ions was performed in 10 mM acetate buffer at pH 7 with 3 cycles of laser illumination (810 nm) with three pulses of 1 s at 16 W/cm² each.

The cumulative quantity of released silver ions is shown and the results show clearly that the heating of "Combined Au—Ag mesh" upon light irradiation induces an enhanced release of silver ions to the external medium.

Figure 4:
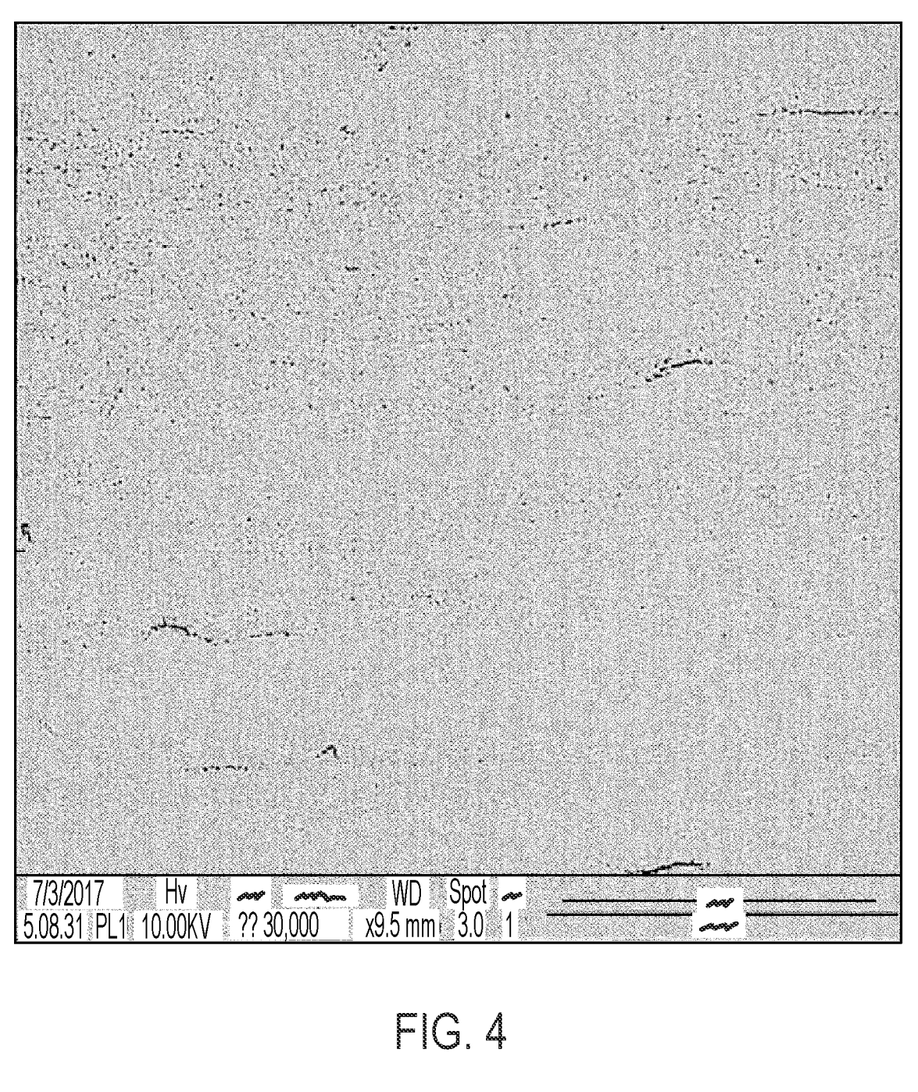
FIG. 4 shows the SEM (Scanning Electron Microscopy) microscopy of the surface of Optilene® Mesh LP surface, wherein the surface is modified with gold nanoparticles anchored to the mesh surface but lacking releasable silver ions.

FIG. 4 shows the SEM (Scanning Electron Microscopy) microscopy of the surface of Optilene® Mesh LP surface, wherein the surface is modified with gold nanoparticles anchored to the mesh surface but lacking releasable silver ions.

Figure 5:
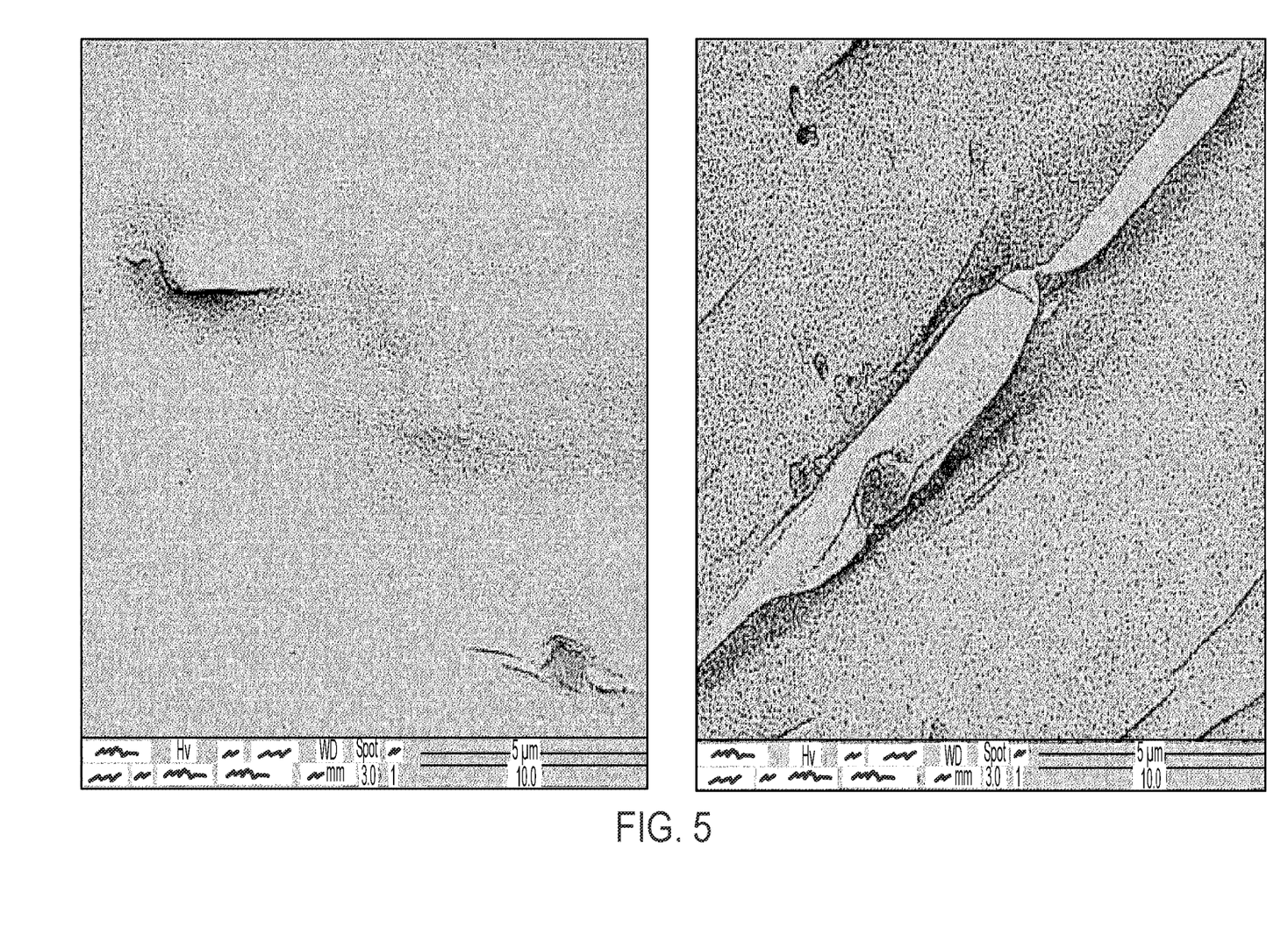
FIG. 5 shows the SEM (Scanning Electron Microscopy) microscopy of the surface of Optilene® Mesh LP, wherein the mesh surface is modified with gold nanoparticles anchored to the mesh surface and wherein the mesh is further modified with zeolite carriers containing releasable silver ions.

FIG. 5 shows the SEM (Scanning Electron Microscopy) microscopy of the surface of Optilene® Mesh LP, wherein the mesh surface is modified with gold nanoparticles anchored to the mesh surface and wherein the mesh is further modified with zeolite carriers containing releasable silver ions.

Example 1: Preparation of Modified Surfaces of Meshes with or without the Antimicrobial Agent The functionalization of three different polypropylene Optilene® Silver Meshes was carried out by cold plasma polymerization to obtain reactive amino groups on the polymeric mesh surface and citrate stabilized gold nanoparticles having a rod-shape were anchored to the surface of the mesh. The following three different meshes have been employed:
1. Optilene® Mesh LP (without silver ions)
2. Optilene® Silver Mesh LP with 125 ppm silver ions (in total) and
3. Optilene® Silver Mesh LP with 250 ppm silver ions (in total)

The silver ions of the meshes recited under to 2. and 3. are supported by a zeolite carrier.

For reproducibility purposes, the three mesh types were incubated in the same bath of rod-shaped gold nanoparticles in citrate buffer 20 mM pH 6.5. An excess of rod-shaped gold nanoparticles were used in order not to be limited by the quantity of rod-shaped gold nanoparticles. A determination of the content of gold nanoparticles was performed with ICP-OES (Inductively Coupled Plasma—Optical Emission Spectrometry) measurements and corresponding calculations of the number of rod-shaped gold nanoparticles per μm² was done:

TABLE 2

Experimental result of the mesh surface modification

|  | Au (μg/mg) | NR/μm² |
|---|---|---|
| Optilene ® Mesh LP without silver ions | 2.018 | 373 |
| Optilene ® Silver Mesh LP 125 ppm silver ions | 2.2015 | 407 |
| Optilene ® Silver Mesh LP 250 ppm silver ions | 2.1845 | 404 |

In SEM no significant difference on the fixation of rod-shaped gold nanoparticles were found in terms of quantity and/or organization on the silver ions containing meshes. The fixation of the rod-shaped gold nanoparticles to the mesh surface was not effected by zeolite particles containing silver ions in the polypropylene matrix (see FIGS. 4 and 5).

Example 2: Temperature Increase of a Surgical Mesh Upon Light Irradiation, Heating Enhancement Two Optilene® Meshes each of which comprising gold nanoparticles being anchored to the mesh surface and additionally comprising releasable silver ions but differing in terms of content of the releasable silver ions (125 ppm and 250 ppm, respectively) where subjected to laser illumination (810 nm) over 30 seconds. The same illumination procedure was applied to an Optilene® Mesh being modified with gold nanoparticles bonded to its surface but lacking releasable silver ions.

The power used for the meshes without releasable silver ions, in the following abbreviated as "Au mesh", was 0.435 W/cm². The power used for the mesh comprising both the gold nanoparticles and releasable silver ions, in the following abbreviated as "Au—Ag mesh", was 0.355 W/cm² to avoid melting. There were no significant differences on the gold nanoparticles (rod-shape) detectable on the mesh surface in terms of quantity and/or organization on the different surfaces.

Surprisingly, the temperature increase was higher for the "Au—Ag meshes". These findings are shown in the below table 3: (see also FIGS. 1 and 2)

TABLE 3

Summarized results of the temperature increase (average of 20 measurements for each mesh)

| | Optilene ® Mesh LP without silver ions | Optilene ® Silver Mesh LP 125 ppm silver ions | Optilene ® Silver Mesh LP 250 ppm silver ions |
|---|---|---|---|
| NR/µm² | 377 | 407 | 404 |
| Laser (W/cm²) | 0.435 | 0.355 | 0.355 |
| Δt °C./W | 151.4 | 180.9 | 192.2 |

Example 3: Enhanced Silver Ion Release Under Illumination Experiment Comparing "Au—Ag Mesh" with "Ag Mesh"

Ag mesh: 125 ppm Ag in polypropylene, Au—Ag mesh: 125 ppm Ag combined with rod-shaped gold nanoparticles anchored to the mesh surface.

Four pieces of each mesh were placed in petri dishes containing 40 ml of 10 mM acetate buffer with pH 7. The mesh samples were illuminated at 1.8, 3.8 and 5.8 hours and the medium was analyzed by ICP-MS (Inductively Coupled Plasma—Mass Spectrometry) at 2, 4 and 6 hours. The illumination was performed using laser light at 810 nm with 16 W/cm² with three shots of 1 s each (see FIG. 3).

SUMMARY

The afore-described examples confirm a substantial increase of heating of surgical meshes under light irradiation, wherein the meshes comprise thermal gold nanoparticles supporting localized surface plasmon resonance anchored to the mesh surface and wherein the meshes additionally comprise releasable silver ions (as antimicrobial substance) in comparison to meshes having thermal gold nanoparticles bonded to the mesh surface but lacking releasable silver ions. Additionally, an enhanced silver ion release could be detected under light irradiation for surgical meshes which comprise both thermal gold nanoparticles being anchored to the mesh surface and releasable silver ions compared to surgical meshes which are merely modified with thermal gold nanoparticles being anchored to the mesh surface (i.e. lacking releasable silver ions). This advantageously leads to an optimized, in particular enhanced, antimicrobial, in particular bacteriostatic or bactericidal, activity of the surgical meshes. Moreover, the irradiation process permits a control of the combined antimicrobial concepts (physical antimicrobial concept which is induced by the thermal gold nanoparticles and chemical antimicrobial concept which is induced by the releasable silver ions). In other words, combination of thermal gold nanoparticles and releasable silver ions results in enhanced heating and boosted silver ions release from the respective equipped meshes during light irradiation, when necessary in a non-invasive manner, as many times it is desired, whenever it is necessary and, if desired, locally confined.

The invention claimed is:

1. A device configured for antimicrobial activity, the device comprising:
   a device body having a surface, wherein the device body is configured to anchor thermal nanoparticles supporting optical resonance at its surface, wherein the device body comprises:
   thermal nanoparticles supporting optical resonance bonded to the surface of the device body, wherein the thermal nanoparticles are configured to increase their temperature by light irradiation in a wavelength range that matches with a wavelength of an optical resonance of the thermal nanoparticles; and
   an antimicrobial substance, wherein the antimicrobial substance is releasable from the device body.

2. The device according to claim 1, wherein the antimicrobial substance is releasable from the device body in an ionic condition.

3. The device according to claim 1, wherein the antimicrobial substance is present in an ionic condition.

4. The device according to claim 1, wherein the antimicrobial substance comprises a metal or an alloy.

5. The device according to claim 1, wherein the antimicrobial substance is embodied as metallic cations.

6. The device according to claim 1, wherein the antimicrobial substance is supported by a carrier.

7. The device according to claim 6, wherein the carrier is embodied as particles having a mean diameter from 100 nm to 20 µm.

8. The device according to claim 6, wherein the carrier is a open-pored carrier.

9. The device according to claim 6, wherein the antimicrobial substance has a proportion from 0.01% by weight to 15% by weight related to a total weight of the carrier.

10. The device according to claim 6, wherein the antimicrobial substance and the carrier altogether have a proportion from 0.01% by weight to 20% by weight related to the total weight of the device body.

11. The device according to claim 6, wherein the carrier is a zeolite.

12. The device according to claim 1, wherein the thermal nanoparticles comprise a material selected from the group consisting of gold, silver, copper, zinc, titanium, a non-metallic material or a combination thereof.

13. The device according to claim 1, wherein the device body further comprises a non-degradable or non-absorbable material.

14. The device according to claim 1, wherein the device body comprises a textile structure.

15. The device according to claim 1, wherein the device is a medical device.

16. The device according to claim 1, wherein the thermal nanoparticles comprise an oxide material.

17. The device according to claim 1, wherein the thermal nanoparticles comprise a metal oxide material.

18. The device according to claim 6, wherein the antimicrobial substance and/or carrier is configured to increase a temperature rise of the thermal nanoparticles per Watt of light irradiation.

19. The device according to claim 1, wherein the antimicrobial substance is releasable from the device body by application of light to the thermal nanoparticles.

\* \* \* \* \*